(12) United States Patent
Sugizaki et al.

(10) Patent No.: US 8,181,487 B2
(45) Date of Patent: May 22, 2012

(54) OPTICAL FIBER PREFORM MANUFACTURING METHOD

(75) Inventors: Ryuichi Sugizaki, Tokyo (JP); Naomi Kumano, Tokyo (JP); Iwao Shimotakahara, Tokyo (JP); Harumi Inaba, Tokyo (JP); Takeshi Yagi, Tokyo (JP); Tomoya Shimizu, Tsukuba (JP); Toshio Kurashima, Tsukuba (JP); Kazuhide Nakajima, Tsukuba (JP)

(73) Assignees: Furukawa Electric Co., Ltd., Tokyo (JP); Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 12/875,167

(22) Filed: Sep. 3, 2010

(65) Prior Publication Data

US 2010/0326139 A1    Dec. 30, 2010

Related U.S. Application Data

(63) Continuation of application No. PCT/JP2010/050831, filed on Jan. 22, 2010.

(60) Provisional application No. 61/146,819, filed on Jan. 23, 2009.

(51) Int. Cl.
*C03B 37/022* (2006.01)

(52) U.S. Cl. ............... 65/393; 65/412; 65/433; 264/1.24

(58) Field of Classification Search .......... 65/393, 65/412, 433; 264/1.24
See application file for complete search history.

(56) References Cited

U.S. PATENT DOCUMENTS

| 2006/0130528 | A1 | 6/2006 | Nelson et al. |
| 2006/0213230 | A1 | 9/2006 | Miyabe et al. |
| 2008/0310806 | A1 | 12/2008 | Mukasa et al. |
| 2009/0052853 | A1 | 2/2009 | Mukasa et al. |
| 2009/0252468 | A1 | 10/2009 | Sugizaki et al. |

FOREIGN PATENT DOCUMENTS

| JP | 2002-293562 | 10/2002 |
| JP | 2002-321935 | 11/2002 |
| JP | 2003-081656 | 3/2003 |
| JP | 2003-342031 | 12/2003 |
| JP | 2003-342032 | 12/2003 |
| JP | 2004-123468 | 4/2004 |
| JP | 2004-307250 | 11/2004 |

OTHER PUBLICATIONS

U.S. Appl. No. 12/938,104, filed Nov. 2, 2010, Takahashi, et al.

*Primary Examiner* — Matthew Daniels
*Assistant Examiner* — Lisa Herring
(74) *Attorney, Agent, or Firm* — Oblon, Spivak, McClelland, Maier & Neustadt, L.L.P.

(57) ABSTRACT

An optical fiber preform manufacturing method includes: supporting a drilling jig in a radial direction of a preform that is cylinder-shaped; moving the drilling jig in a longitudinal direction of the preform; and forming a plurality of slits each extending in the longitudinal direction and each directed from an outer side of the preform toward a center the preform, and a plurality of holes each extending in the longitudinal direction and each connecting with an end of one of the plurality of slits in a depth direction of the one of the plurality of slits.

7 Claims, 7 Drawing Sheets

OPTICAL FIBER PREFORM MANUFACTURING METHOD

CROSS-REFERENCE TO RELATED APPLICATIONS

This application is a continuation of PCT International Application No. PCT/JP2010/050831 filed on Jan. 22, 2010 which claims the benefit of priority from U.S. Provisional Application No. 61/146,819 filed on Jan. 23, 2009, the entire contents of which are incorporated herein by reference.

BACKGROUND OF THE INVENTION

1. Field of the Invention

The present invention relates to an optical fiber preform manufacturing method for manufacturing an optical fiber having holes extending in a longitudinal direction.

2. Description of the Related Art

Optical fibers having holes extending in a longitudinal direction, so-called microstructure optical fibers, have characteristics that cannot be achieved by optical fibers having a normal structure of confining light with a core and a cladding, and thus are expected to be optical fibers of the next generation. A holey fiber, a hole-assisted fiber, and a photonic bandgap fiber are known as the microstructure optical fibers.

The holey fiber has holes formed around a region that has a substantially uniform refractive index and that is near a center axis, and guides light with a core, which is the region near the center axis in which the holes are not formed. The hole-assisted fiber has holes formed around a core of an optical fiber of a normal structure. The photonic bandgap fiber has a hole formed on a center axis and becoming a core, and has holes cyclically formed around this hole, thereby generating a photonic bandgap to guide light.

A stack-and-draw method and a drilling method are known as methods of manufacturing a preform for a microstructure optical fiber. The stack-and-draw method is a method of manufacturing a preform for a microstructure optical fiber by bundling plural capillary tubes. The hole drilling method is a method of manufacturing a preform for a microstructure optical fiber by forming through-holes in a longitudinal direction of the preform with a drill (see Japanese Patent Application Laid-open No. 2002-321935 and Japanese Patent Application Laid-open No. 2003-342032).

The stack-and-draw method is suitable for arranging many holes in a constant cycle. However, in the stack-and-draw method, capillary tubes need to be prepared as many as the number of holes to be formed, and therefore procurement of parts is difficult. Furthermore, because unintended vacant space is formed between the capillary tubes, characteristics of the optical fiber can become unstable.

The drilling method is suitable for arranging a small number of holes at arbitrary positions in a cross-sectional direction. When a microstructure optical fiber is manufactured, desired optical-fiber characteristics need to be achieved by controlling arrangement positions and shapes of its holes precisely. Therefore, in manufacturing a preform for a microstructure optical fiber, the hole drilling method is used in many cases, particularly when the number of holes to be arranged is small.

However, when the drilling method is used, a hole having a length greater than that of a drill used in the drilling method cannot be formed in one drilling process. Specifically, the length of a drill is about 500 millimeters at most, and thus a hole having a length larger than 500 millimeters cannot be formed in one hole drilling process. Therefore, when the hole drilling method is used, there is a constraint on the length of manufacturable preforms. Accordingly, when the hole drilling method is used, manufacturing large preforms is difficult, and it is difficult to reduce the manufacturing cost of an optical fiber having holes extending in a longitudinal direction.

SUMMARY OF THE INVENTION

It is an object of the present invention to at least partially solve the problems in the conventional technology.

According an aspect of the present invention, an optical fiber preform manufacturing method includes: supporting a drilling jig in a radial direction of a preform that is cylinder-shaped; moving the drilling jig in a longitudinal direction of the preform; and forming a plurality of slits each extending in the longitudinal direction and directed from an outer side of the preform toward a center the preform, and a plurality of holes each extending in the longitudinal direction and connecting with an end of one of the plurality of slits in a depth direction of the one of the plurality of slits.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

An optical fiber preform manufacturing method according to an embodiment of the present invention will be explained below with reference to the drawings.

[Configuration of Optical Fiber Preform]

A configuration of an optical fiber preform according to an embodiment of the present invention will be explained first with reference to FIGS. 1 and 2.

Figure 1:
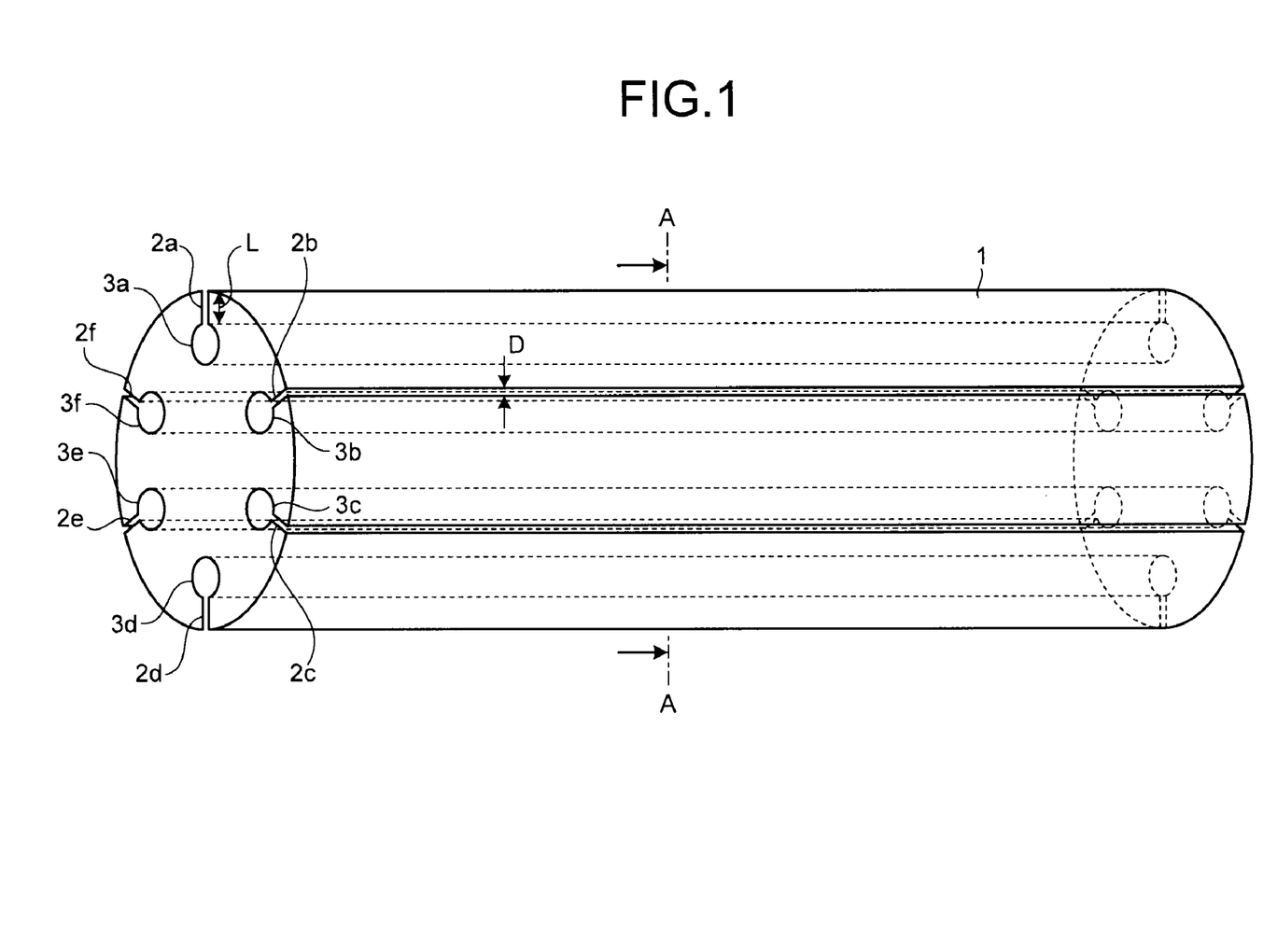
FIG. 1 is a perspective view of a configuration of an optical fiber preform according to an embodiment of the present invention.
Figure 2:
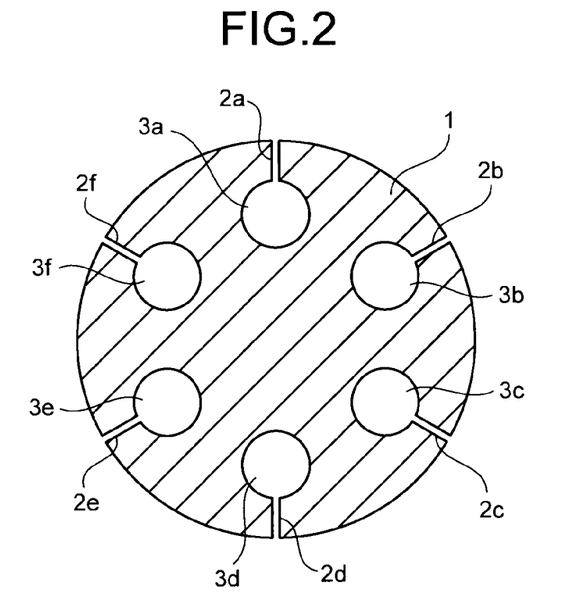
FIG. 2 is a cross-sectional view along a line A-A of the optical fiber preform depicted in FIG. 1.

FIG. 1 is a perspective view of the configuration of the optical fiber preform according to the embodiment of the present invention. FIG. 2 is a cross-sectional view along a line A-A of the optical fiber preform depicted in FIG. 1. As depicted in FIGS. 1 and 2, the optical fiber preform according to the embodiment of the present invention includes a cylindrical preform 1, plural slits 2a to 2f extending in a longitudinal direction of the preform 1 and formed on an outer peripheral surface of the preform 1, and plural holes 3a to 3f connecting with the slits 2a to 2f and extending in the longitudinal direction of the preform 1.

The preform 1 is formed of silica based glass. Specifically, the preform 1 is formed of a material having a region near a center axis, which has a substantially uniform refractive index. A material having a core having a higher refractive index than that at an outer peripheral portion on the center axis may be used as the preform 1. The plural slits 2a to 2f have a predetermined depth L from the outer peripheral surface of the preform 1 toward a center axis direction of the preform 1. The plural holes 3a to 3f connect with the slits 2a to 2f at ends of the slits in a depth direction. While details are described later, preferably, the predetermined depth L is equal to or larger than 2 millimeters and equal to or smaller than 20 millimeters. A width D of each of the slits is preferably equal to or larger than 0.5 millimeter and equal to or smaller than a quarter of a diameter of the holes 3a to 3f.

Figure 3:
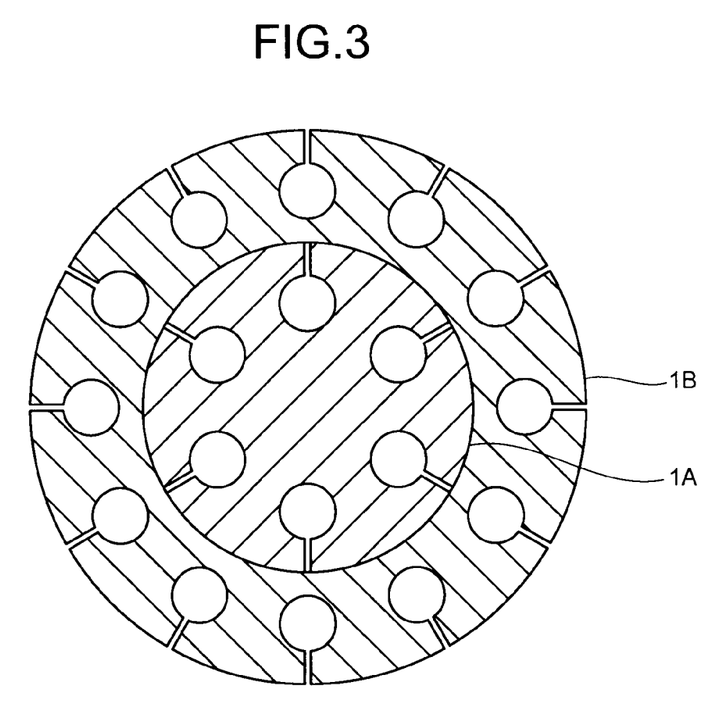
FIG. 3 is a cross-sectional view of a modification of the optical fiber preform depicted in FIG. 1.
Figure 4:
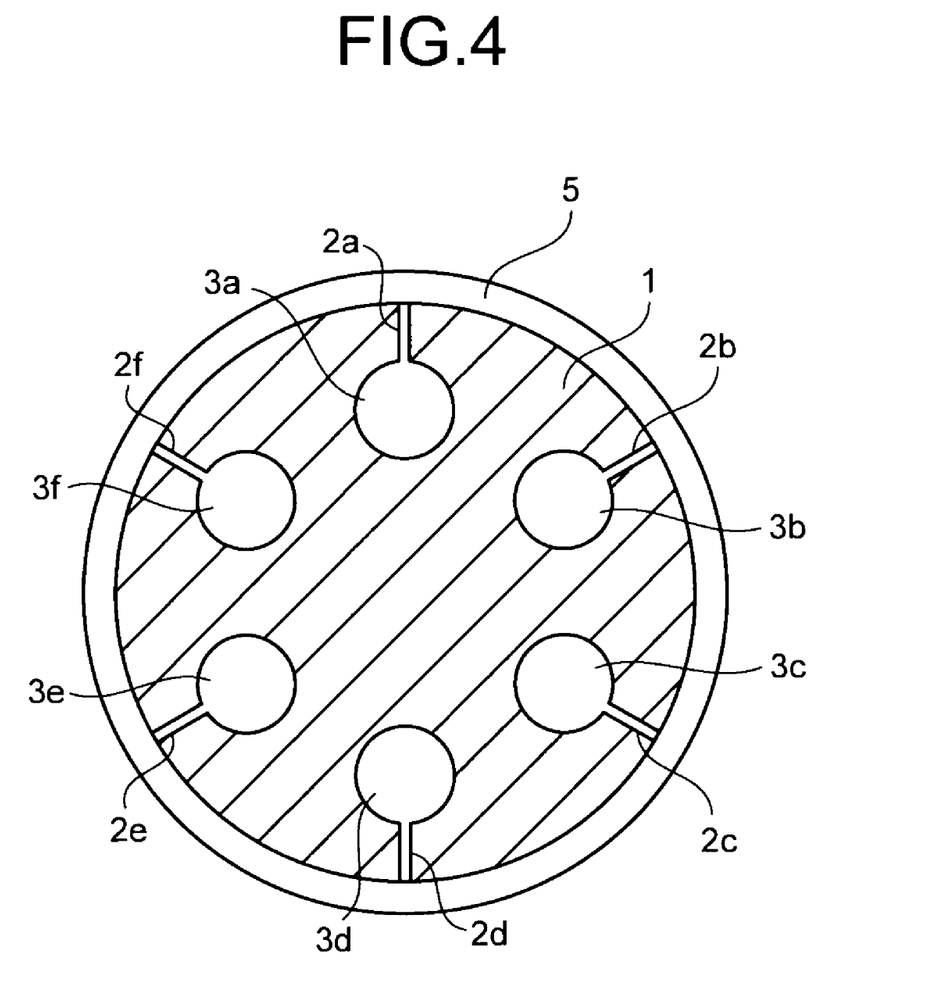
FIG. 4 is a cross-sectional view of another modification of the optical fiber preform depicted in FIG. 1.

Although the optical fiber preform has only one layer of the preform 1 according to the present embodiment, the optical fiber preform may be a preform having multiple layers of holes by accommodating a preform 1A in a tubular preform 1B having slits and holes formed therein as depicted in FIG. 3. Alternatively, as depicted in FIG. 4, the preform 1 and a tubular member 5 may be integrated with each other by accommodating the preform 1 in the tubular member 5 such as a glass tube and by fusing the preform 1 with the tubular member 5.

[Method of Manufacturing a Preform for Optical Fiber]

A method of manufacturing the optical fiber preform depicted in FIG. 1 will be explained with reference to FIGS. 5A and 5B.

Figure 5A:
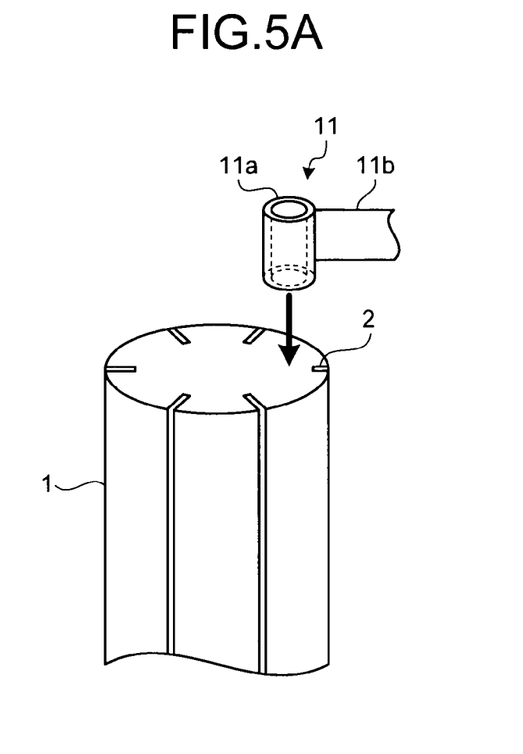
FIG. 5A is a conceptual diagram for explaining a manufacturing method of the optical fiber preform depicted in FIG. 1.
Figure 5B:
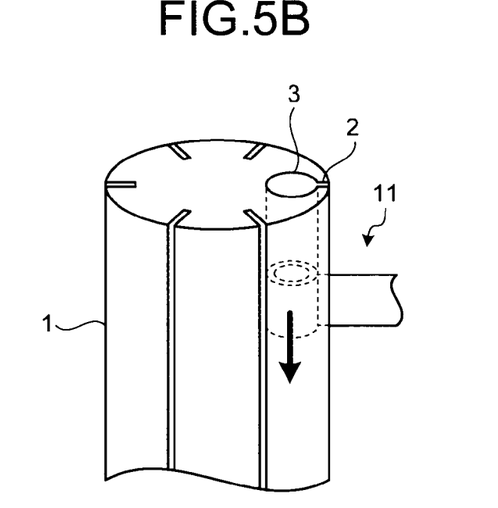
FIG. 5B is another conceptual diagram for explaining a manufacturing method of the optical fiber preform depicted in FIG. 1.

FIGS. 5A and 5B are schematic diagrams for explaining the method of manufacturing the optical fiber preform depicted in FIG. 1. When the optical fiber preform depicted in FIG. 1 is manufactured, as depicted in FIG. 5A, plural slits 2 extending in a longitudinal direction of the preform 1 are first formed on the outer peripheral surface of the preform 1 by using a grindstone or a file, and thereafter a drilling jig 11 having a tubular drill portion 11a and an arm portion 11b supporting the drill portion 11a is set at a longitudinal-direction end of the preform 1. Next, as depicted in FIG. 5B, the drilling jig 11 is moved along the longitudinal direction of the preform 1 to pass the arm portion 11b through the slits 2, thereby forming plural holes 3 connecting with the slits 2 and extending in the longitudinal direction of the preform 1. Consequently, the optical fiber preform depicted in FIG. 1 is manufactured.

Further, the preform 1 having the holes 3 formed therein is stretched in a longitudinal direction to make an outer diameter of the preform 1 a predetermined size by using a well-known heating method such as a method of heating with a flame, a high-frequency-induction plasma torch, or an electric furnace. A long optical fiber preform may be manufactured by stretching the preform 1 after forming the holes 3. Because not only the outer diameter of the preform 1 but also diameters of the holes are decreased by stretching the preform 1, the diameters of the holes drilled by the drilling jig 11 may be large. As a result, formation of the holes 3 by the drilling jig 11 and also cleaning the inside of the holes 3 are facilitated.

As it is clear from the above explanation, according to the optical fiber preform manufacturing method according to the embodiment of the present invention, the plural slits 2 extending in the longitudinal direction of the preform 1 are formed on the outer peripheral surface of the cylindrical preform 1, the drilling jig 11 is introduced into a predetermined position in the radial direction of the preform 1 via the slits 2, and the drilling jig 11 is moved in the longitudinal direction of the preform 1, thereby forming the plural holes 3 connecting with the slits 2 and extending in the longitudinal direction of the preform 1. That is, in the optical fiber preform manufacturing method according to the embodiment of the present invention, the drilling jig 11 is introduced via the slits 2 which are open faces, and the drilling by the drilling jig 11 is performed. Therefore, according to the optical fiber preform manufacturing method of the embodiment of the present invention, drilling up to an unlimited length is possible in principle, unlike in a conventional drilling method of forming through-holes using a drill, and thus, an optical fiber having holes extending in a longitudinal direction is economically manufacturable.

If, before the stretching, the slits 2 are eliminated to leave only the holes 3 by heating the outer periphery portion of the preform 1 by a well-known heating method such as a method of heating using a flame, a high-frequency-induction plasma torch, and an electric furnace, the preform 1 similar to that formed with through-holes is able to be formed. However, in this case, heating temperature of the preform 1 is preferably within a ±1% range of a softening point temperature of the silica based glass forming the preform 1. When the heating temperature is low, the shape of the preform 1 does not change, and the slits 2 are not eliminated. On the contrary, when the heating temperature is high, the shape of the holes 3 is changed.

The softening point temperature of the silica based glass is 1800° C. When the actually manufactured preforms 1 were heated at 1773° C., 1782° C., 1800° C., 1818° C., and 1827° C., it was confirmed that the slits 2 were not eliminated at 1773° C., and the slits 2 were eliminated at or above 1782° C. However, when the preform 1 was heated at 1827° C., circularity (=(minimum diameter/maximum diameter)×100) of the holes 3 became 85%. From the above, if aiming only to eliminate the slits 2, the preform 1 may be heated to or above the softening point temperature of the silica based glass forming the preform 1, but if aiming to maintain shapes of the holes 3 while eliminating the slits 2, the preform 1 may be heated to a temperature near the softening point temperature of the silica based glass forming the preform 1.

When the depth L of the slits 2 is small, the distance between the hole 3 and the outer periphery of the preform 1 becomes short, and this becomes a cause of cracks being generated upon machining. On the contrary, when the depth L of the slits 2 is large, the length of the arm portion 11b becomes long and precision of positions at which the holes 3 are formed becomes low. When the length of the arm portion 11b becomes large, load on the arm portion 11b becomes large, and this becomes a cause of damaging the drilling jig 11. Therefore, the depth L of the slit 2 is preferably equal to or larger than 2 millimeters and equal to or smaller than 20 millimeters.

When the width D of the slits 2 is small, the arm portion 11b may contact a sidewall of the slits 2, and this may become an obstacle upon movement of the arm portion 11b. On the contrary, when the width D of the slit 2 is large, the holes 3 may be deformed greatly as the slits 2 are eliminated upon heating the outer periphery portion of the preform 1 to eliminate the slits 2. Therefore, the width D of the slits 2 is preferably equal to or larger than 0.5 millimeter and equal to or smaller than a quarter of a diameter of the holes 3a to 3f.

Figure 6:
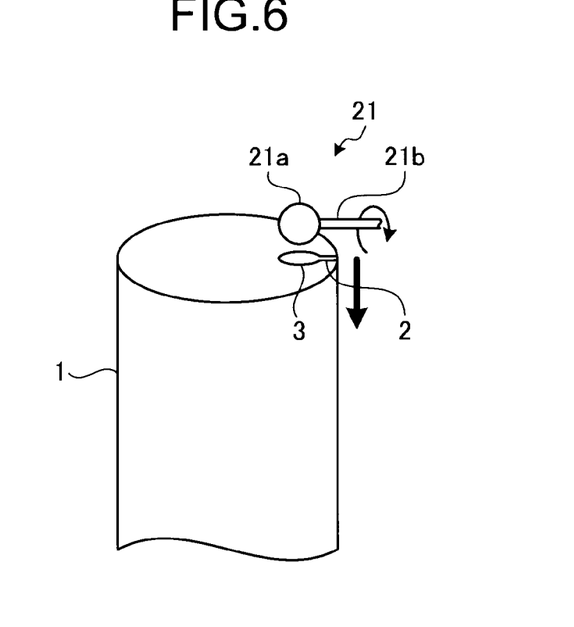
FIG. 6 is still another conceptual diagram for explaining a manufacturing method of the optical fiber preform depicted in FIG. 1.

In the present embodiment, although the holes 3 are formed by using the drilling jig 11 depicted in FIG. 5A, the slits 2 and the holes 3 may be simultaneously formed, as depicted in FIG. 6, by setting, in a longitudinal-direction end of the preform 1, a drilling jig 21 made of a spherical drill portion 21a and an arm portion 21b, such as a file for forming slits, which supports the drilling unit 21a, and moving the drilling jig 21 along a longitudinal direction of the preform 1 while rotating the drill portion 21a with the arm portion 21b as a rotation axis.

Figure 7:
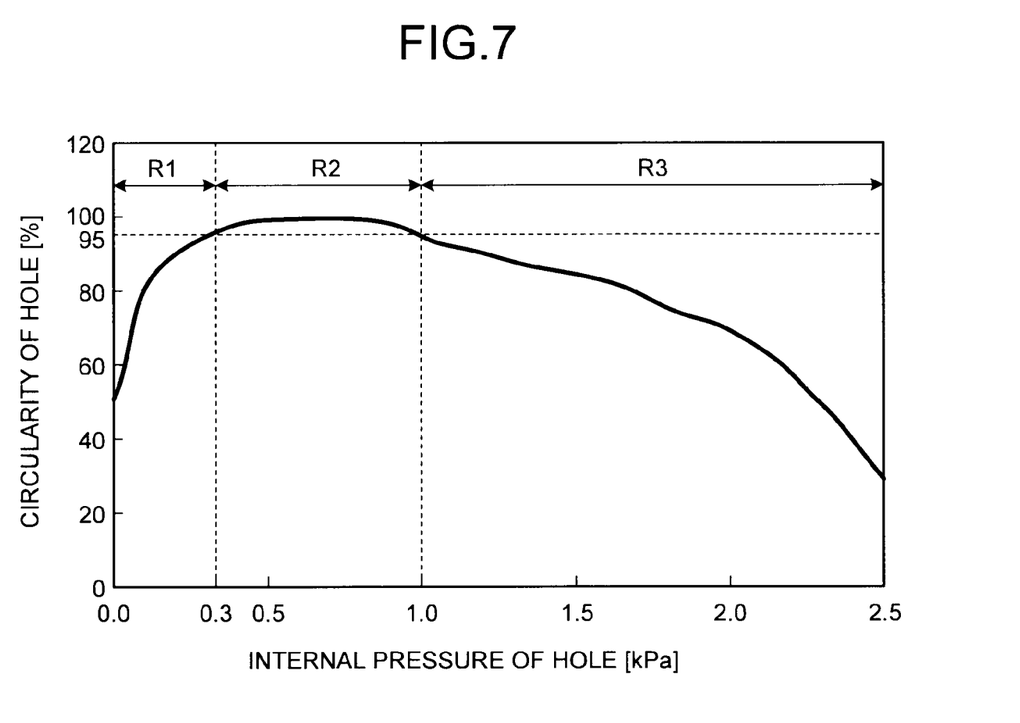
FIG. 7 depicts a relationship between pressure in a hole at the time of stretching an optical fiber preform and circularity of the hole.
Figure 8A:
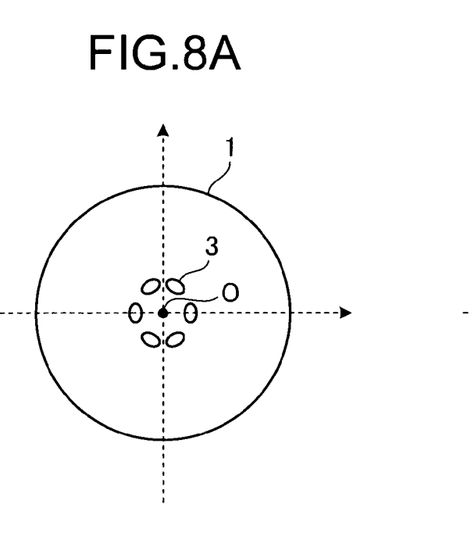
FIG. 8A is a schematic diagram of a change in shapes of holes when a pressure in the holes at the time of stretching an optical fiber preform is less than an optimal pressure.
Figure 8B:
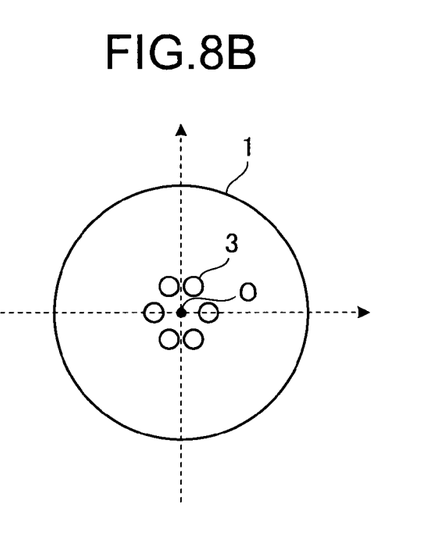
FIG. 8B is a schematic diagram of a change in shapes of holes when a pressure in the holes at the time of stretching an optical fiber preform is at an optimal pressure.
Figure 8C:
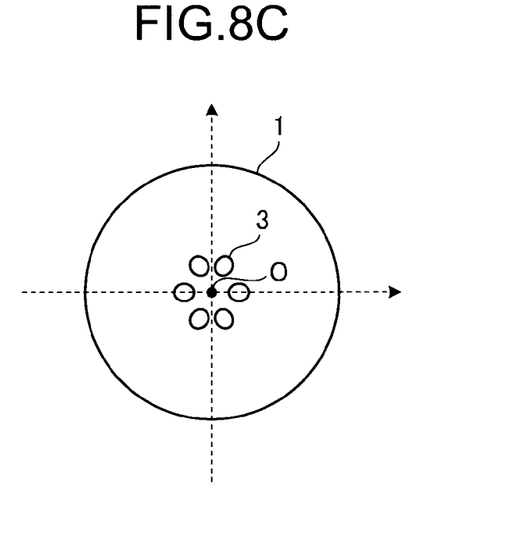
FIG. 8C is a schematic diagram of a change in shapes of holes when a pressure in the holes at the time of stretching an optical fiber preform is greater than a proper value.

When the optical fiber preform is stretched after eliminating the slits 2, the circularity of holes depends on pressure in the holes at a heat-softened part. FIG. 7 depicts a relationship between pressure in holes and circularity of the holes when a radius r of the holes after stretching is 2 millimeters. When a pressure in the holes is within a range of a region R1 depicted in FIG. 7, the outer diameter of the holes 3 decreases in a direction from a center position O of the preform 1 toward an outer periphery and the circularity decreases, as depicted in FIG. 8A. When a pressure in the holes is within a range of a region R2 depicted in FIG. 7, the hole 3 keeps its completely round state and the circularity does not decrease greatly, as depicted in FIG. 8B. On the contrary, when a pressure in the holes is within a range of a region R3 as depicted in FIG. 7, the outer diameter of the holes 3 increases in a direction from the center position O of the preform 1 toward the outer periphery and the circularity decreases, as depicted in FIG. 8C.

Therefore, when the optical fiber preform is stretched after the slits 2 are eliminated, the pressure in the holes at the heat-softened part needs to be controlled to be at an optimal value. Specifically, when the radius r of the holes after the stretching is to be 2 millimeters, a pressure in the holes at the heat-softened part is preferably set at a value corresponding to the region R2 depicted in FIG. 7, that is, at a pressure that is 0.3 kPa to 1 kPa greater than atmospheric pressure. Consequently, the deformation of the holes becomes small, and characteristics of the optical fiber are able to be stabilized.

Figure 9:
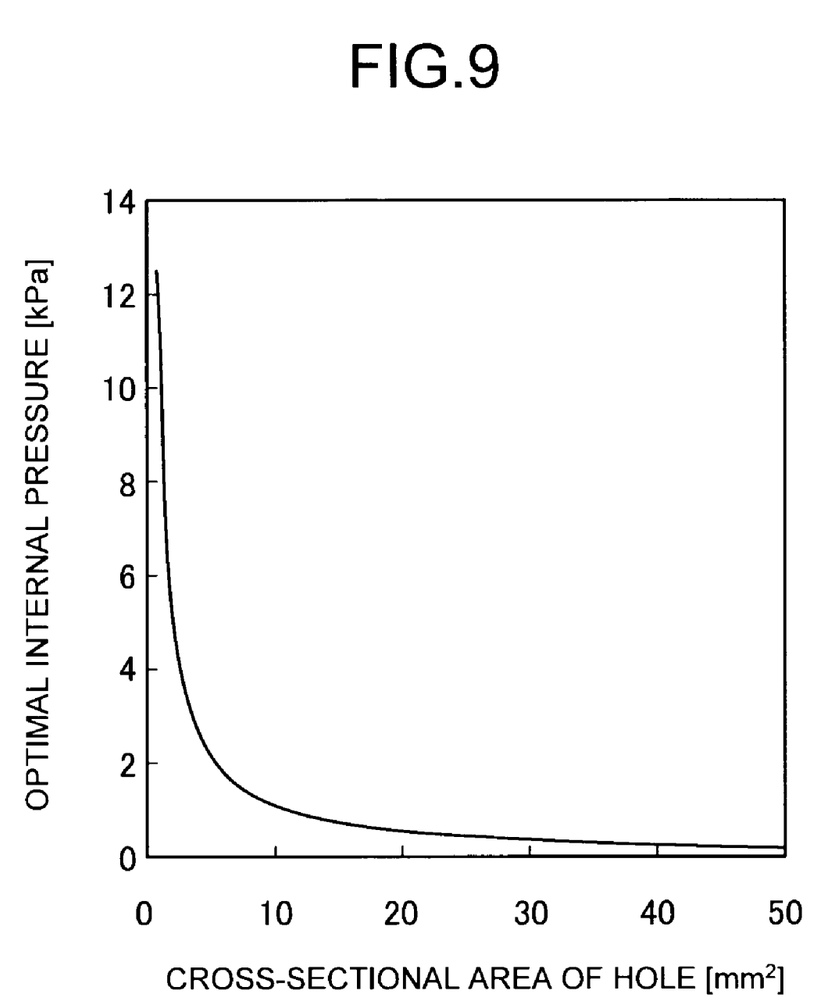
FIG. 9 depicts a relationship between cross-sectional area of a hole after stretching and optimal pressure in the holes at the time of stretching the optical fiber preform.

However, an optimal value of a pressure in the holes changes according to a cross-sectional area of a hole after the stretching as depicted in FIG. 9. That is, an optimal value of a pressure in the holes becomes smaller when the cross-sectional area of the hole after the stretching becomes larger. Therefore, when the optical fiber preform is stretched, an optimal value of a pressure in the holes needs to be set correspondingly to a targeted value of the cross-sectional area of the hole. A pressure in the holes may be adjusted by a method of sealing both ends of the holes or by a method of supplying an inert gas.

As depicted in FIG. 4, the preform 1 and a tubular member may be integrated by inserting the preform 1 into the tubular member such as a glass tube, heating the preform 1 to a ±1% range of a softening point temperature of the silica based glass forming the preform 1 to fuse the preform 1 with the tubular member. A heating method of the preform 1 may be, for example, a well-known heating method such as a method of heating using a flame, a high-frequency-induction plasma torch, and an electric furnace. When fusing, by making a clearance between an inner diameter of the tubular member and an outer diameter of the preform 1 about one millimeter, fusing with both ends of the preform 1 open may be performed, without controlling an internal pressure of the holes. The optical fiber may be manufactured by performing fiber-stretching simultaneously with fusing.

A cladding may be further formed around the preform 1 having the holes 3 formed therein. A method of forming the cladding may be, for example, a method of inserting into the tubular member the preform 1 having the holes 3 formed therein and crushing the tubular member, or a method of depositing soot around the preform 1 having the holes 3 formed therein and vitrifying. When the cladding is formed around the preform 1 having the holes 3 formed therein, positions to form the holes 3 and the size of the holes 3 are set in advance by taking into consideration a quantity of the cladding to be formed. When the cladding is formed by the method of crushing the tubular member, an optical fiber may be manufactured by simultaneously performing fiber-stretching.

While embodiments to which the invention made by the present inventors is applied have been explained above, the present invention is not limited to the descriptions and the drawings, which form a part of the disclosure of the present invention according to these embodiments. That is, all of any other embodiments, examples, operational techniques, and the like, which are realized by those skilled in the art based on the present embodiments, are included in the scope of the present invention.

According an embodiment of the present invention, an optical fiber having holes extending in a longitudinal direction is economically manufacturable.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A method of manufacturing an optical fiber preform, comprising:
    supporting a drilling jig in a radial direction of a preform that is cylinder-shaped;
    moving the drilling jig in a longitudinal direction of the preform; and
    forming a plurality of slits each extending in the longitudinal direction and directed from an outer side of the preform toward a center the perform; and
    forming a plurality of holes each extending in the longitudinal direction and connecting with an end of one of the plurality of slits in a depth direction of the one of the plurality of slits, wherein
    a width of each of the plurality of slits is smaller than a diameter of each of the plurality of holes.

2. The method according to claim 1, wherein the depth of each of the plurality of slits is equal to or larger than 2 millimeters and equal to or smaller than 20 millimeters.

3. The method according to claim 1, wherein the width of each of the plurality of slits is equal to or larger than 0.5 millimeter and equal to or smaller than a quarter of a diameter of each of the plurality of holes.

4. The method according to claim 1, further comprising eliminating the plurality of slits by heating the preform.

5. The method according to claim 4, wherein the preform is heated to be in a temperature range of a softening point temperature ±1% of the preform.

6. The method according to claim 1, further comprising:
    accommodating the preform in a glass tube; and
    integrating the preform with the glass tube.

7. The method according to claim 6, wherein the preform and the glass tube are integrated by heating the preform to be in a temperature range of a softening point temperature ±1% of the preform.

* * * * *